US006619106B2

(12) United States Patent
Pursifull

(10) Patent No.: US 6,619,106 B2
(45) Date of Patent: Sep. 16, 2003

(54) HIGH-RESOLUTION ELECTRONIC THROTTLE POSITION SYSTEM

(75) Inventor: Ross Dykstra Pursifull, Dearborn, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 86 days.

(21) Appl. No.: 09/819,559

(22) Filed: Mar. 28, 2001

(65) Prior Publication Data

US 2002/0011100 A1 Jan. 31, 2002

Related U.S. Application Data

(60) Provisional application No. 60/186,929, filed on Mar. 3, 2000.

(51) Int. Cl.[7] .............................................. G01M 15/00
(52) U.S. Cl. ........................................................ 73/116
(58) Field of Search ................................ 123/349, 352, 123/399, 436, 479; 251/69; 73/116, 118.1, 118.2, 119 A

(56) References Cited

U.S. PATENT DOCUMENTS 5,673,668 A * 10/1997 Pallett et al. ............... 123/436
5,899,191 A * 5/1999 Rabbit et al. ............... 123/479
6,095,488 A * 8/2000 Semeyn, Jr. et al. .... 251/129.12

* cited by examiner

*Primary Examiner*—Kamand Cuneo
*Assistant Examiner*—Monica D. Harrison
(74) *Attorney, Agent, or Firm*—John E. Kajander

(57) ABSTRACT

A high-resolution position sensing apparatus for determining the angular position of a throttle plate located in an electronic throttle and controlled by a PCM includes a first throttle position sensor and a second throttle position sensor. The first throttle position sensor is coupled to the throttle plate and generates a first throttle position sensor output signal. The first throttle position sensor output signal is a negative slope signal and is affine to the position of the throttle plate from full closed to full open. The second throttle position sensor is also coupled to the throttle plate and generates a second throttle position sensor output signal. The second throttle position sensor output signal is a positive slope signal and is affine to the position of the throttle plate from full closed to approximately one-half open. Because the second sensor is used over a smaller range it may be used to achieve a higher signal resolution over that smaller range.

12 Claims, 2 Drawing Sheets

FIG. 1
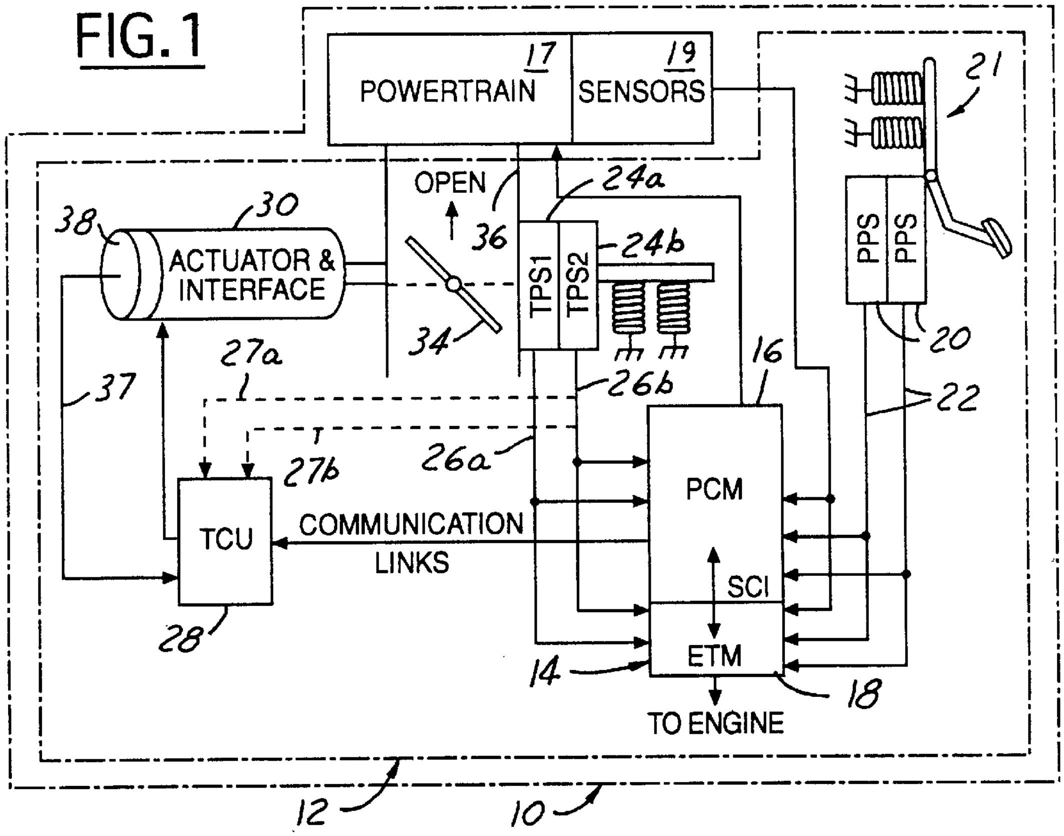
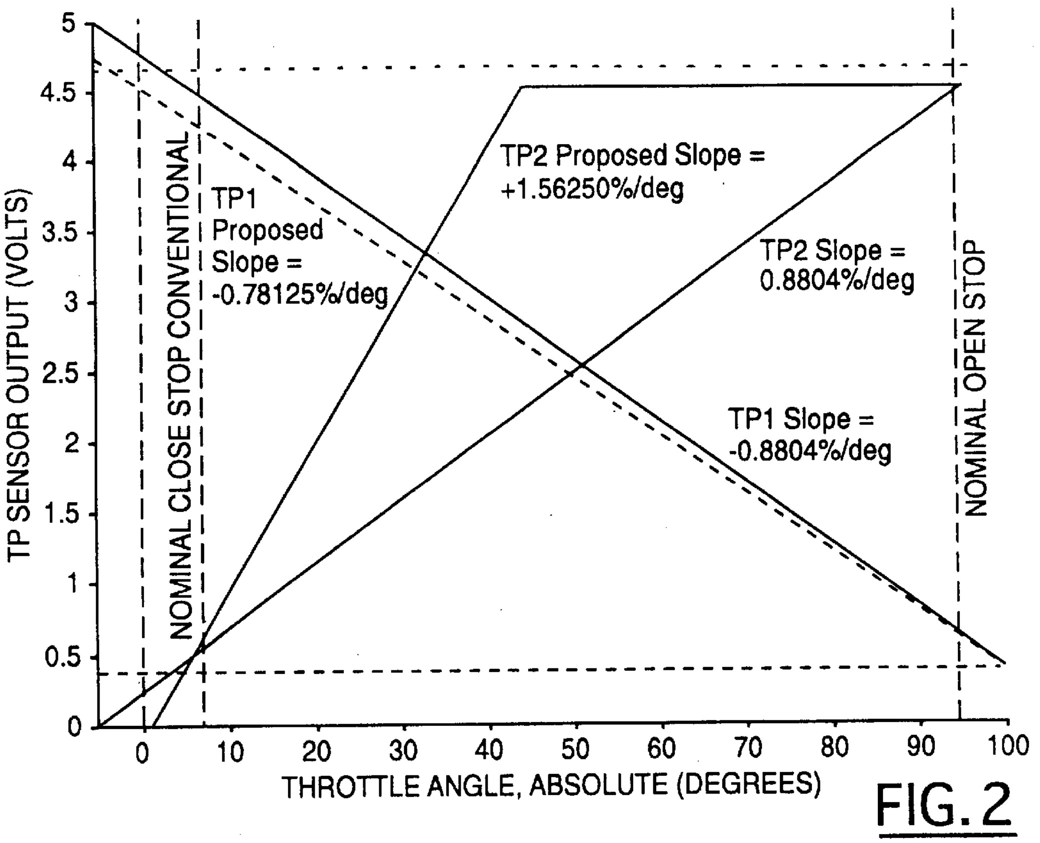
FIG. 2

HIGH-RESOLUTION ELECTRONIC THROTTLE POSITION SYSTEM

RELATED APPLICATIONS

This application claims the benefit of earlier filed provisional patent application Ser. No. 60/186,929 filed on Mar. 3, 2000, entitled, "Throttle Slope For Resolution Enhancement."

TECHNICAL FIELD

The present invention relates generally to control system for internal combustion engines, and more particularly, to a high-resolution electronic throttle position system.

BACKGROUND ART

Many previously known motor vehicle throttle controls have a direct physical linkage between an accelerator pedal and the throttle so that the throttle plate is pulled open by the accelerator cable as the driver presses the pedal. The direct mechanical linkage includes a biasing force that defaults the linkage to a reduced operating position, in a manner consistent with regulations. Nevertheless, such mechanisms are often simple and unable to adapt fuel consumption efficiency to changing traveling conditions, and add significant weight and components to the motor vehicle.

An alternative control for improving throttle control and the precise introduction of fuel air mixtures into the engine cylinders is provided by electronic throttle controls. The electronic throttle control includes a throttle position controller that positions the throttle plate by an actuator controlled by a microprocessor based on the sensor feedback. The processors are often included as part of a powertrain electronic control that can adjust the fuel and air intake and ignition in response to changing conditions of vehicle operation as well as operator control. Protection may be provided so that an electronic system does not misread or misdirect the control and so that unintended operation is avoided when portions of the electronic control suffer a failure.

One previously known type of protection to avoid unintended actuation of excessive throttle is to employ sensor redundancies, whereby more than one sensor responds to a particular condition so that the failure of a single sensor or an electronic component does not induce a throttle position greater than commanded throttle position.

Typically, motorized throttle bodies have two throttle position sensors. One of those sensors (or an average of both) is used for feedback position control. The throttle position is encoded as a continuous voltage (normally zero to five volts). The voltage is read by an analog-to-digital converter with a fixed resolution (typically about five millivolts per A/D count over the range of five volts). Typically, the throttle position sensor has a gain that is approximately ⅛th degree for every five millivolts. This results in a nominal fine motion control of ⅛th degree equally over the entire range of the throttle plate. Unfortunately, fine motion control is most important where the throttle is the predominant air control. This occurs in approximately the first 10 degrees of throttle opening.

The disadvantages associated with these conventional electronic throttle position sensor techniques have made it apparent that a new technique for electronic throttle position sensing is needed. The new technique should allow higher resolution motion control than the prior art and should not add cost or reduce reliability. The present invention is directed to these ends.

SUMMARY OF THE INVENTION

It is, therefore, an object of the invention to provide an improved and reliable high-resolution electronic throttle position system. Another object of the invention is to provide higher resolution motion control than the prior art. An additional object of the invention is reduce overall electronic system cost while improving reliability.

In accordance with the objects of this invention, a high-resolution electronic throttle position system is provided. In one embodiment of the invention, a high-resolution position sensing apparatus for determining the angular position of a throttle plate located in an electronic throttle and controlled by a PCM includes a first throttle position sensor and a second throttle position sensor. The first throttle position sensor is coupled to the throttle plate and generates a first throttle position sensor output signal. The first throttle position sensor output signal is a negative slope signal and is affine to the position of the throttle plate from a full closed position to full open position. The second throttle position sensor is also coupled to the throttle plate and generates a second throttle position sensor output signal. The second throttle position sensor output signal is a positive slope signal and is affine to the position of the throttle plate from the full closed position to approximately half open. Because the second sensor is used over a smaller range it may be used to achieve a higher signal resolution over that smaller range.

The present invention thus achieves an improved high-resolution electronic throttle position system. The present invention is advantageous in that by using a high gain throttle position sensor the need for a PCM amplification circuit is eliminated.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which:

FIG. 1 is a schematic high-resolution electronic throttle position system in accordance with one embodiment of the present invention;

FIG. 2 is a graph comparing a voltage output of a first throttle position sensor to a voltage output of a second throttle position sensor for full throttle plate travel in accordance with one embodiment of the present invention.

BEST MODES FOR CARRYING OUT THE INVENTION

Figure 3:
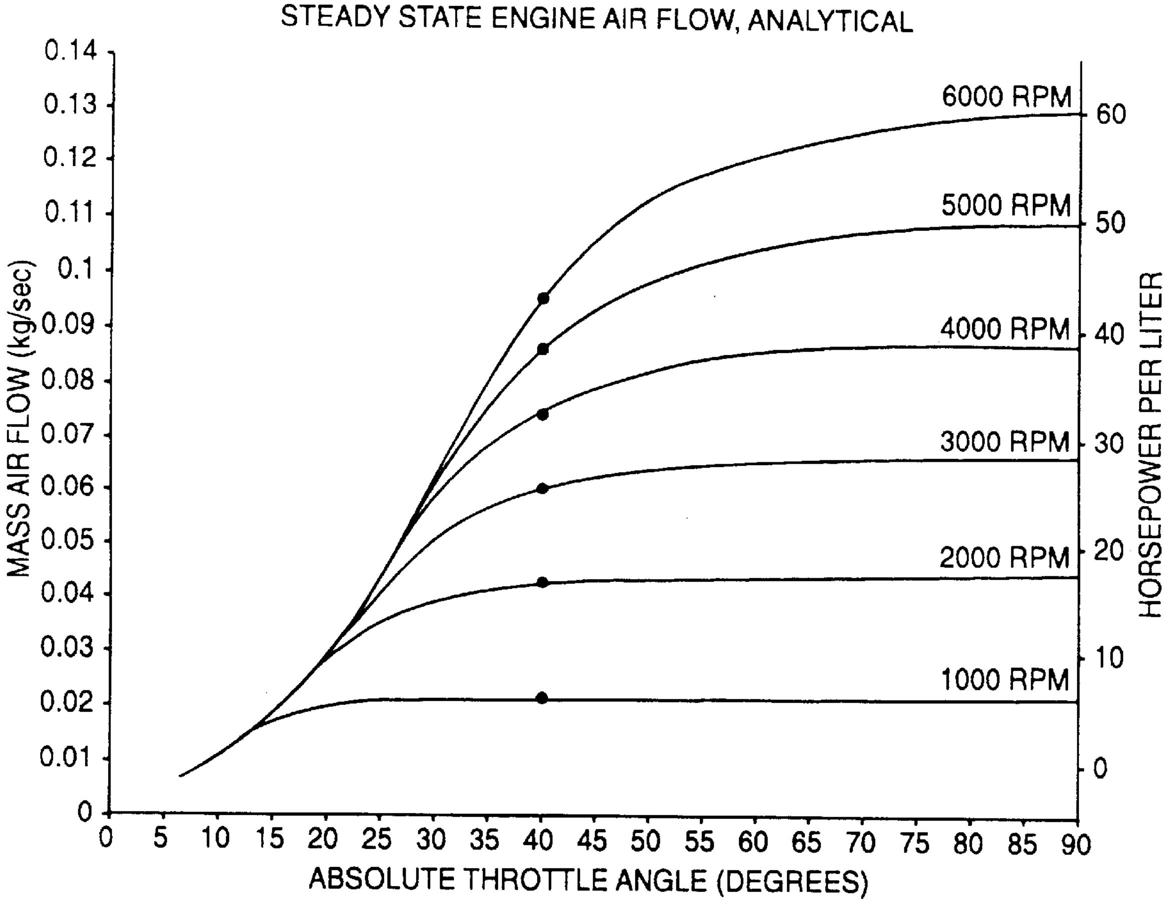
FIG. 3 is a graph of engine horsepower produced at differing RPMs for full throttle plate travel in accordance with one embodiment of the present invention.

In the following figures, the same reference numerals will be used to identify identical components in the various views. The present invention is illustrated with respect to a high-resolution electronic throttle position system particularly, suited for the automotive field. However, the present invention is applicable to various other uses that may require high-resolution electronic throttle position system.

Referring to FIG. 1, a motor vehicle powertrain system 10 including electronic throttle control system 12 includes an electronic control unit 14. In the preferred embodiment, the electronic control unit 14 includes a powertrain control module (PCM) 16 including a main processor and an electronic throttle monitor (ETM) 18 including an independent processor. The PCM and ETM share sensors 19 and actuators that are associated with the powertrain system 17 and control module 16. Preferably, the electronic throttle monitor 18 includes a processor physically located within the powertrain control module housing. Although a separate housing is shown, separate locations and other embodiments can also be employed in practicing the invention. Moreover, while the electronic throttle monitor 18 and the powertrain control module 16 have independent processors, they share the inputs and outputs of powertrain sensors 19 and actuators such as the pedal 21 arid throttle plate 34, respectively, for independent processing.

A wide variety of inputs are represented in the FIG. 1 diagram by the diagrammatic representation of redundant pedal position sensors 20. The sensors 20 are coupled through inputs 22 and are representative of many different driver controls that may demonstrate the demand for power. In addition, the electronic control unit 14 includes inputs **20*a* and 26*b* for detecting throttle position. A variety of ways for providing such indications is diagrammatically represented in FIG. 1 by a first throttle position sensor 24*a* and a redundant second throttle position sensor 24*b* to obtain a power output indication. Inputs 40 from the sensors 19 are also shown. As a result of the many inputs represented at 40, 22, 26*a* and 26*b*, the electronic controller 14 provides outputs for limiting output power so that output power does not exceed power demand. A variety of outputs are also diagrammatically represented in FIG. 1 by the illustrated example of inputs to a throttle control unit 28 that in turn powers an actuator and motive interface 30 for displacing the throttle plate 34. For example, an actuator and interface may comprise redundant drive motors powering a gear interface to change the angle of the throttle plate 34 in the throttle body 36**.

Likewise, the responsive equipment like motors may also provide feedback. For example, the motor position sensor 38 or the throttle position sensors **24*a* and 24*b* may provide feedback to the throttle control unit 28, as shown at 37, 27*a* and 27*b***, respectively, to determine whether alternative responses are required or to maintain information for service or repair.

Referring to FIG. 2, a graph comparing a voltage output of a first throttle position sensor **24*a* to a voltage output of a second throttle position sensor 24*b* for full throttle plate 34 travel in accordance with one embodiment of the present invention is illustrated. In the present invention, first throttle position sensor 24*a* is used as the primary sensor for control of throttle plate 34. Second throttle position sensor 24*b* is only used for primary control if first throttle position sensor 24*a* fails. However, because the slope of the voltage output of second throttle position sensor 24*b* is much steeper, it may be used in conjunction with first throttle position sensor 24*a* to achieve added resolution over the first forty degrees of throttle plate 34 travel. Additionally, because the gain of second throttle position sensor 24*b* is high, amplification circuitry normally present in PCM 16** may be eliminated.

As shown in FIG. 2, second throttle position sensor **24*b* saturates at approximately 49 degrees of throttle plate 34 travel in a valid voltage region. Because of this, when second throttle position sensor 24*b* is being used as the primary control throttle plate 34 will only open to approximately 49 degrees. Empirical data, however, has shown that most engine performance occurs at the beginning of throttle plate 34 travel (see FIG. 3). Therefore, use of only throttle position sensor 24*b* will have little effect on available engine power. While the present invention is illustrated using throttle position sensors having zero to five volt outputs, one skilled in that art would realize that the present system may be designed to use any range of outputs. Also, the choice of how much throttle plate 34** travel (in this case 49 degrees) is covered is a design choice based on desired engine performance.

In one preferred embodiment, first throttle position sensor **24*a* is a falling slope sensor. This allows either an open or short to ground (common failure modes) to tend to close throttle plate 34. However, one skilled in the art would recognize that a rising slope sensor may be used for identical control with slightly less desirable failure modes. Ideally, the slope of second throttle position sensor 24*b* is selected to maximize the voltage output difference between first throttle position sensor 24*a* and second throttle position sensor 24*b* to allow detection of the failure condition where the throttle position sensors are shorted together. In the present case, this results in second throttle position sensor 24*b* having a rising slope output in the desired throttle position range. One skilled in the art, however, would realize that either a rising or falling slope output may be used depending on design constraints. Preferably, when first throttle position sensor 24*a* is selected to have a rising slope output, second throttle position sensor 24*b*** is selected to have a falling slope output.

Referring to FIG. 3, a graph of engine horsepower produced at differing engine speeds for throttle plate 34 travel in accordance with one embodiment of the present invention is illustrated. As discussed previously, proper selection of how much throttle plate 34 travel is limited versus the desired resolution gain is highly critical to proper system performance. This is shown in the graphs presented in FIG. 3.

As shown, should the TP1 fail, then the controller would control with TP2, as TP2 has a smaller usable range. With the throttle limited to controlling between close stop and 45 degrees, only negligible power reduction is provided for engine speeds less than 3000 rpm. At an engine speed of 6000 rpm, the power reduction is only 20 percent.

The present invention thus achieves an improved and reliable high-resolution electronic throttle position system by providing higher resolution motion control than the prior art where the throttle is the predominant air control. The present invention does this while reducing overall electronic system cost and improving reliability. Additionally, the present invention eliminates the need for a PCM amplification circuit by using a high gain throttle position sensor.

From the foregoing, it can be seen that there has been brought to the art a new and improved high-resolution electronic throttle position system. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims.

What is claimed is:

1. A high-resolution position sensing apparatus for determining the angular position of a throttle plate located in an electronic throttle and controlled by a PCM, said sensing apparatus comprising:

a first throttle position sensor coupled to the throttle plate and generating a first throttle position sensor output signal, said first throttle position sensor output signal being affine to a position of the throttle plate and different over a first range of motion of the throttle plate; and a second throttle position sensor coupled to the throttle plate and generating a second throttle position sensor output signal, said second throttle position sensor output signal being affine to a position of the throttle plate and different over a second range of motion of the throttle plate, where said second range is less than said first range, and wherein said first range of motion of the throttle plate extends from approximately full closed to approximately full open.

2. A high-resolution position sensing apparatus for determining the angular position of a throttle plate located in an electronic throttle and controlled by a PCM, said sensing apparatus comprising:

a first throttle position sensor coupled to the throttle plate and generating a first throttle position sensor output signal, said first throttle position sensor output signal being affine to a position of the throttle plate and different over a first range of motion of the throttle plate; and a second throttle position sensor coupled to the throttle plate and generating a second throttle position sensor output signal, said second throttle position sensor output signal being affine to a position of the throttle plate and different over a second range of motion of the throttle plate, where said second range is less than said first ranges and wherein said second range of motion of the throttle plate extends from approximately full dosed to approximately one-half open.

3. A high-resolution position sensing apparatus for determining the angular position of a throttle plate located in an electronic throttle and controlled by a PCM, said sensing apparatus comprising:

a first throttle position sensor coupled to the throttle plate and generating a first throttle position sensor output signal, said first throttle position sensor output signal being affine to a position of the throttle plate and different over a first range of motion of the throttle plate; and a second throttle position sensor coupled to the throttle plate and generating a second throttle position sensor output signal, said second throttle position sensor output signal being affine to a position of the throttle plate and different over a second range of motion of the throttle plate, where said second range is less than said first range, and wherein said first throttle position sensor output signal is a negative slope signal, where said first throttle position sensor output signal is a maximum voltage when the throttle plate is approximately full dosed and a minimum voltage when the throttle plate is approximately full open.

4. A high-resolution position sensing apparatus for determining the angular position of a throttle plate located in an electronic throttle and controlled by a PCM, said sensing apparatus comprising:

a first throttle position sensor coupled to the throttle plate and generating a first throttle position sensor output signal, said first throttle position sensor output signal being affine to a position of the throttle plate and different over a first range of motion of the throttle plate; and a second throttle position sensor coupled to the throttle plate and generating a second throttle position sensor output signal said second throttle position sensor output signal being affine to a position of the throttle plate and different over a second range of motion of the throttle plate, where said second range is less than said first range, and wherein said first throttle position sensor output signal is a positive slope signal, where said first throttle position sensor output signal is a minimum voltage when the throttle plate is approximately full closed and a maximum voltage when the throttle plate is approximately full open.

5. A high-resolution position sensing apparatus for determining the angular position of a throttle plate located in an electronic throttle and controlled by a PCM, said sensing apparatus comprising:

a first throttle position sensor coupled to the throttle plate and generating a first throttle position sensor output signal, said first throttle position sensor output signal being affine to a position of the throttle plate and different over a first range of motion of the throttle plate; and a second throttle position sensor coupled to the throttle plate and generating a second throttle position sensor output signal, said second throttle position sensor output signal berg affine to a position of the throttle plate and different over a second range of motion of the throttle plate, where said second range is less than said first range, and wherein said second throttle position sensor output signal is a negative slope signal, where said second throttle position sensor output signal is a maximum voltage when the throttle plate is approximately full closed and a minimum voltage when the throttle plate is greater than predetermined position, where said predetermined position is less than approximately full open.

6. The high-resolution position sensing apparatus as recited in claim 5, wherein said predetermined position is approximately one-half open.

7. A high-resolution position sensing apparatus for determining the angular position of a throttle plate located in an electronic throttle and controlled by a PCM, said sensing apparatus comprising:

a first throttle position sensor coupled to the throttle plate and generating a first throttle position sensor output signal, said first throttle position sensor output signal being affine to a position of the throttle plate and different over a first range of motion of the throttle plate; and a second throttle position sensor coupled to the throttle plate and generating a second throttle position sensor output signal, said second throttle position sensor output signal being affine to a position of the throttle plate and different over a second range of motion of the throttle plate, where said second range is less than said first range, and wherein said second throttle position sensor output signal is a positive slope signal, where said second throttle position sensor output signal is a minimum voltage when the throttle plate is approximately full dosed and a maximum voltage when the throttle plate is greater than a predetermined position, where said predetermined position is less than approximately full open.

8. The high-resolution position sensing apparatus as recited in claim 7, wherein said predetermined position is approximately one-half open.

9. A high-resolution position sensing apparatus for determining the angular position of a throttle plate located in an electronic throttle and controlled by a PCM, said sensing apparatus comprising:

a first throttle position sensor coupled to the throttle plate and generating a first throttle position sensor output signal, said first throttle position sensor output signal being affine to a position of the throttle plate and different over a first range of motion of the throttle plate; and a second throttle position sensor coupled to the throttle plate and generating a second throttle position sensor output signal, said second throttle position sensor output signal being affine to a position of the throttle plate and different over a second range of motion of the throttle plate, where said second range is less than said first range, and wherein said first throttle position sensor output signal is between zero and five volts.

10. A high-resolution position sensing apparatus for determining the angular position of a throttle plate located in an electronic throttle and controlled by a PCM, said sensing apparatus comprising:

a first throttle position sensor coupled to the throttle plate and generating a first throttle position sensor output signal, said first throttle position sensor output signal being affine to a position of the throttle plate and different over a first range of motion of the throttle plate; and a second throttle position sensor coupled to the throttle plate and generating a second throttle position sensor output signal, said second throttle position sensor output signal being affine to a position of the throttle plate and different over a second range of motion of the throttle plate, where said second range is less than said first range, and wherein said second throttle position sensor output signal is between zero and five volts.

11. A high-resolution position sensing apparatus for determining the angular position of a throttle plate located in an electronic throttle and controlled by a PCM, said sensing apparatus comprising:

a first throttle position sensor coupled to the throttle plate and generating a first throttle position sensor output signal, said first throttle position sensor output signal being affine to a position of the throttle plate and different over a first range of motion of the throttle plate; and a second throttle position sensor coupled to the throttle plate and generating a second throttle position sensor output signal, said second throttle position sensor output signal being affine to a position of the throttle plate and different over a second range of motion of the throttle plate, where said second range is less than said first range, and wherein said first throttle position sensor output signal is a falling slope signal, where said first throttle position sensor output signal is a maximum voltage when the throttle plate is approximately full dosed and a minimum voltage when the throttle plate is approximately full open and wherein said second throttle position sensor output signal is a rising slope signal, where said second throttle position sensor output signal is a minimum voltage when the throttle plate is approximately full closed and a maximum voltage when the throttle plate is greater than a predetermined position, where said predetermined position is less than approximately full open.

12. A high-resolution position sensing apparatus for determining the angular position of a throttle plate located in an electronic throttle and controlled by a PCM, said sensing apparatus comprising:

a first throttle position sensor coupled to the throttle plate and generating a first throttle position sensor output signal, said first throttle position sensor output signal being affine to a position of the throttle plate and different over a first range of motion of the throttle plate; and a second throttle position sensor coupled to the throttle plate and generating a second throttle position sensor output signal, said second throttle position sensor output signal being affine to a position of the throttle plate and different over a second range of motion of the throttle plate, where said second range is less than said first range, and wherein said first throttle position sensor output signal and said second throttle position sensor output signal are selected to maximize a voltage difference between said signals.

* * * * *